(12) United States Patent
Buxton et al.

(10) Patent No.: US 7,543,181 B2
(45) Date of Patent: Jun. 2, 2009

(54) RECOVERY FROM FAILURES WITHIN DATA PROCESSING SYSTEMS

(75) Inventors: Robert Frank Buxton, Hampshire (GB); David James Fisher, Bournemouth (GB); Jose Emir Garza, Richmond (GB); Stephen James Hobson, Middlesex (GB); Paul Hopewell, Chandlers Ford (GB); Paul Kettley, Winchester (GB); Robert Daniel Millar, Fareham (GB); Peter Siddall, Romsey (GB); Stephen Richard Walker, Lockerley (GB)

(73) Assignee: Lenovo (Singapore) Ptd. Ltd., Singapore (SG)

( * ) Notice: Subject to any disclaimer, the term of this patent is extended or adjusted under 35 U.S.C. 154(b) by 157 days.

(21) Appl. No.: 10/553,018

(22) PCT Filed: Oct. 22, 2003

(86) PCT No.: PCT/GB03/04589

§ 371 (c)(1),
(2), (4) Date: Aug. 31, 2006

(87) PCT Pub. No.: WO2004/090724

PCT Pub. Date: Oct. 21, 2004

(65) Prior Publication Data

US 2007/0088970 A1    Apr. 19, 2007

(30) Foreign Application Priority Data

Apr. 10, 2003   (GB) ................................. 0308264.1

(51) Int. Cl.
*G06F 11/00*   (2006.01)

(52) U.S. Cl. ......................................................... 714/15

(58) Field of Classification Search .................... 714/15, 714/20, 21
See application file for complete search history.

(56) References Cited

U.S. PATENT DOCUMENTS 5,465,328 A   11/1995  Dievendorff et al.

(Continued)

FOREIGN PATENT DOCUMENTS

EP   8 506 321 A2   9/1992

(Continued)

OTHER PUBLICATIONS

Mohan, et al; Algorithms for the Management of Remote Backup Data Bases for Disaster Recovery; Data Base Technology Institute, IBM Almaden Research Center; 1993; IEEE.

*Primary Examiner*—Bryce P Bonzo
(74) *Attorney, Agent, or Firm*—Winstead PC; Charlie Bustamante

(57) ABSTRACT

Provided are methods, data processing systems, recovery components and computer programs for recovering from storage failures affecting data repositories. At least a part of the recovery processing is performed while the data repositories are able to receive new data and to allow retrieval of such new data. Although new data items may be received into the repository and retrieved therefrom during recovery processing, updates to the data repository which were performed before the failure and which are then restored to the repository by the recovery processing are restored within a recovery unit of work and are inaccessible to processes other than the recovery process until successful completion of the recovery unit of work. The recovery processing ensures that the recovered repository is consistent with the state of the repository at the time of the failure, but is available for addition and retrieval of new data items before completion of the recovery processing.

16 Claims, 5 Drawing Sheets

U.S. PATENT DOCUMENTS

| | | |
|---|---|---|
| 5,745,674 A | 4/1998 | Lupton et al. .......... 395/182.18 |
| 6,353,834 B1 * | 3/2002 | Wong et al. .................. 707/202 |
| 6,594,781 B1 * | 7/2003 | Komasaka et al. ............ 714/19 |
| 6,993,537 B2 * | 1/2006 | Buxton et al. ............ 707/104.1 |
| 7,039,773 B2 * | 5/2006 | Hu et al. ..................... 711/158 |
| 7,096,382 B2 * | 8/2006 | Novick ........................ 714/20 |
| 7,260,739 B2 * | 8/2007 | Burton et al. ................... 714/6 |
| 2001/0047495 A1 | 11/2001 | Kettley et al. ................... 714/2 |
| 2002/0049776 A1 | 4/2002 | Aronoff et al. |
| 2002/0059316 A1 | 5/2002 | Kettley et al. ............... 707/200 |
| 2002/0066051 A1 | 5/2002 | Hobson et al. ................ 714/16 |
| 2003/0191984 A1 * | 10/2003 | Flaherty et al. ............... 714/20 |

FOREIGN PATENT DOCUMENTS

| | | |
|---|---|---|
| EP | 0 618 534 A2 | 10/1994 |
| JP | 2001-350777 | 12/2001 |
| JP | 2002-202953 | 7/2002 |
| WO | WO 95/10805 | 4/1995 |
| WO | WO 02/073409 A1 | 9/2002 |

* cited by examiner

RECOVERY FROM FAILURES WITHIN DATA PROCESSING SYSTEMS

CROSS REFERENCE TO RELATED APPLICATION

This is a 371 National Phase application of International Application No. PCT/GB2003/004589 filed on 22 Oct. 2003 which claims priority to application Ser. No. GB 0308264.1 filed on 10 Apr. 2003.

FIELD OF INVENTION

The present invention relates to recovery from failures in data processing systems, and in particular to recovery components and methods implemented within computer programs and data processing systems.

BACKGROUND OF THE INVENTION

Even very reliable data processing systems can be susceptible to storage failures, such as disk failures and malfunctions or software malfunctions, that result in loss or corruption of data in primary storage. To avoid such failures resulting in permanent loss of data, it is known to provide recovery capabilities including making backup copies of stored data and taking log records describing the updates to the stored data since the latest backup.

A number of communication manager software products, including IBM Corporation's MQSeries™ and WebSphere™ MQ family of messaging products, provide facilities for storing messages in a data repository such as a message queue or database table during transfer of messages between a sender and a receiver. As with other data processing systems and computer programs, there is a need for solutions for recovering from potential system or program failures to avoid loss of critical messages and to ensure that application program tasks can complete successfully.

In a message queuing system in which queue manager programs handle the transfer of messages between queues, it is known for recovery facilities within the queue manager programs to recover a queue and its message contents when the primary storage used to hold its messages fails. The recovery facilities restore messages to the queue so that the final state of the queue is the same as at the time of the storage failure. These recovery facilities recreate a message queue and a snapshot of its contents from a back-up copy of the queue, and then refer to the queue manager's log records to reapply changes to the queue. In such known solutions, queue managers must complete the recovery processing before any messages are retrieved from the queue, and before any new messages are added to the queue. This ensures that the state of the queue after recovery is the same as the state of the queue at the time of the failure, and that message sequencing is not lost as a result of the failure.

However, a remaining problem with such solutions is the unavailability of the messaging functions and the message repository while the recovery processing is in progress. Many applications require optimum message availability but have competing requirements for the messaging system to provide assured once-only message delivery. If an application is allowed to access a queue during the recovery processing, there is a danger that a single message may be processed twice by the application. A bank customer who has funds debited from his account twice in response to a single funds transfer instruction would be very dissatisfied.

U.S. Pat. No. 6,377,959 issued on 23 Apr. 2002 to Carlson describes a transaction processing system that continues to process incoming transactions during the failure and recovery of either one of two duplicate databases. One of the two duplicates is assigned "active" status, and the other is maintained with "redundant" status. All incoming queries are sent only to the active database and all incoming updates are sent to both the active and redundant databases. When one database fails, the other is assigned active status (if not already active) and continues to process incoming queries and updates during repair and restart of the failed database. Repair and restart of the failed database involves use of interleaved copy and update operations in a single pass through the active database. The interleaving of incoming updates and copy operations is performed according to a queue thresholding method, which controls copy operations in response to the number of incoming transactional updates. The transaction processing system remains operational both during the failure and recovery activities. Since a full replica is maintained, log records are only written when one of the databases fails, and access is not required to the failed database while that database is under repair. Although continuous availability is highly desirable, this solution has the significant processing and storage overhead of maintaining two complete database replicas with interchangeability of the operating status (active or redundant) of each of the two database systems. Furthermore, replication generally does not protect against software corruption, and so recovery operations will be required in addition to replication in some circumstances.

US Patent Application Publication No. 2002/0049776 (published on 25 Apr. 2002 for Aronoff et al) also relates to replicated databases for high availability. The document describes a method for resynchronization of source and target databases following a failure by restarting replication after recovery of the target database and purging stale transactions that have already been applied to the target database during recovery.

An alternative approach is described in U.S. Pat. No. 6,353,834 issued on 5 Mar. 2002 to Wong et al, in which a message queuing system stores messages and state information about the messages, clustered together in a single file on a single disk. This system is intended to achieve efficient writing of data by avoiding writing updates to three different disks (a data disk, an index structure disk and a log disk). A Queue Entry Map Table is used to enter control information, message blocks and log records. U.S. Pat. No. 6,353,834 refers to the use of existing RAID technology and duplicate writing of data, without which the described system provides no protection against storage failures which result in loss of the data held on the single disk.

International Patent Application Publication Number WO 02/073409 discloses a method for recovery of database nodes without stopping write transactions. A failed node is restored using an old version of a database fragment in the failed node together with an up-to-date version of the fragment in another node, by copying the parts of the fragment which have changed since creation of the old version. A delete log is used to enable the recovery processing to take account of deletions since the creation of the old version. Write transactions occurring after the start of recovery processing are performed on the recovering node during the recovery processing.

SUMMARY OF THE INVENTION

Aspects of the present invention provide methods, data processing systems, recovery components and computer programs for recovering from failures affecting data repositories, wherein at least a part of the recovery processing is performed while the data repositories are able to receive new data and to allow retrieval of such new data. The failure may be a hardware failure or malfunction, or a software malfunction, which results in loss or corruption of data in a data repository on a primary storage medium.

Although new data items (i.e. those received after the failure) may be received into the repository and retrieved therefrom during recovery processing, updates to the data repository which were performed before the failure and which are then restored to the repository by the recovery processing are made inaccessible until completion of the recovery processing. The recovery processing can achieve fast availability of the data repository while also ensuring that the recovered repository is consistent with the state of the repository at the time of the failure.

In a first aspect, the present invention provides a method for recovering a data repository from a failure affecting a primary copy of the data repository, including the steps of: maintaining a secondary copy of data sufficient to recreate the primary copy of the data repository and data items held thereon; in response to a failure affecting the primary copy of the data repository, recreating a primary copy of the data repository from the secondary data copy, and using a restore process to restore data items to the primary copy from the secondary copy within a recovery unit of work; wherein data items restored to the primary copy of the data repository within the recovery unit of work are made inaccessible to processes other than the restore process until commit of the recovery unit of work; prior to commit of the recovery unit of work, configuring the primary copy of the data repository to enable addition of data items to the data repository independent of said restoring step and to enable processes other than the restore process to retrieve said independently added data items; and in response to successful completion of the restoring step, committing the recovery unit of work including releasing said inaccessibility of the restored data.

According to a preferred embodiment of the invention, updates to a message repository during normal forward processing of a messaging system include message send operations which add messages to the repository, and message retrieve operations which delete the messages. The "message repository" in this context may be a message queue, a database table, or any other data structure which holds messages or message queues. Following a failure which affects the message repository, the message repository is recreated in an empty state and then send and retrieve operations are reapplied to the repository, preferably by referring to a backup copy of the repository and log records. The message repository is recreated as a preliminary recovery step and messaging functions are able to transfer new messages to and from the message repository prior to completion of recovery. Updates to the message repository which involve reapplying operations from backup storage and log records are handled as uncommitted operations of a Recovery Unit of Work and only committed (i.e. a consistency check is performed and the updates are made final and accessible to other programs) on completion of the Recovery Unit of Work. The Recovery Unit of Work includes the set of operations required (following recreation of the message repository) to restore the contents of the message repository to a state consistent with the state of the repository at the time of the failure. The message repository is available for receipt of new messages as soon as it is recreated, whereas any message which is restored to a queue within the Recovery Unit of Work cannot be retrieved from the repository by a target application program until completion of the Recovery Unit of Work.

The invention is useful for applications in which it is not essential to process data items in the same order as they were added to the data repository. In a first example application, each data item or message is a request for performance of a particular task. If the order of performing the tasks does not matter, then new requests can be received onto the repository and processed without waiting for all previous requests to be recovered.

One embodiment of the invention provides a data communication system for transferring messages between a sender and a receiver, wherein messages are held in a message repository following a message send operation and are subsequently retrieved from the repository for delivery to the receiver. A backup copy of the repository is created, and updated either periodically or in response to predefined events, and log records are written to record message send and message retrieval events including updates to the transactional state of messages, including events that occurred since the most recent backup operation. The system includes a recovery component adapted to control the data communication system to perform the following operational steps: in response to a storage failure affecting the primary copy of the message repository, recreating a primary copy of the data repository and restoring data items to the primary copy by reference to a backup copy of the repository and log records. The backup copy and log records were created during normal forward processing, prior to the failure. The system is configured to enable new messages to be added to the repository and retrieved therefrom without awaiting completion of the recovery processing. Messages restored to the repository and updates applied to the repository by reference to the backup copy or log records are made inaccessible to retrievers until all message repository updates corresponding to send and retrieve operations performed prior to the failure have been reapplied to the message repository. 'New messages' in this context are messages which are added to the repository for the first time after the failure. Messages added to the queue prior to the failure, and then restored to the queue following the failure, are referred to as 'old messages' below.

A further problem with many known communication solutions is the tendency for data to build up in repositories while recovery processing is being carried out—possibly resulting in the repository (or structures within the repository) reaching a 'full' condition. The results could be that some data communications are returned to the sender or build up at an intermediate network location, unless significant additional processing is carried out to prevent this. Improved availability resulting from the solution described above helps to address this problem, but additional improvements can be achieved.

Further embodiments of the present invention provide methods, data processing systems, computer programs and recovery components for performing a method of recovery from storage failures affecting a data repository, for use in a system in which data updates applied to the repository in normal forward processing are applied within transactional units of work. Following a storage failure affecting a primary copy of the data repository, operations required for restoring data items to a primary copy of the data repository are identified with reference to secondary storage but are deferred until a determination has been made of the state, at the time of the failure, of the corresponding original unit of work for each identified operation. The restore operations are then performed or discarded as appropriate according to the determined state of the original unit of work.

Furthermore, if a pair of updates to a message repository correspond to addition of a message and retrieval of the same message, and the pair of updates was completed prior to the failure, the pair of operations can be performed together within recovery processing without risk of leaving the repository in an inconsistent state. In a preferred embodiment of the invention, such 'add-retrieve' pairs of operations are identified when log records are replayed. The pairs of operations are either omitted from the restore processing (i.e. deemed to have been performed as a pair, since their effects on the queue cancel each other out) or the pairs of operations are performed and committed outside of the scope of the Recovery Unit of Work. Each of these options avoids unnecessary processing and reduces the potential build-up of messages.

Preferred embodiments of the invention enable recovery from primary storage failures in a shared-queue messaging system, including recovery of old messages (messages from before queue failure) onto shared queues from backup copies of the queue and log records. The shared queues may be in use by one or more application programs processing new messages (messages sent to the queue after the failure) while old message repository updates are being restored from log records. This message recovery can be performed while also providing assured once-only delivery of messages by handling the entire restore processing as a single unit of work.

By enabling messages to be added to and retrieved from a queue during restoration of messages to the queue, the invention can achieve improved availability of messaging functions following a storage failure.

A further aspect of the present invention provides a data communication system including: data storage for storing a primary copy of a data repository; secondary data storage for storing a secondary copy of data representing the data repository which secondary data is sufficient to recreate the primary copy of the data repository and data held thereon; a recovery component for controlling the operation of the data communication system to recover from a storage failure affecting the primary copy of the data repository, wherein the recovery component is operable to control the data communication system to perform the steps of: recreating a primary copy of the data repository from the secondary data copy, and using a restore process to restore data items to the primary copy, wherein the restore step is performed within a recovery unit of work and wherein data items restored to the primary copy of the data repository within the recovery unit of work are made inaccessible to processes other than the restore process until commit of the recovery unit of work; prior to commit of the recovery unit of work, configuring the primary copy of the data repository to enable addition of data items independent of said restoring step and to enable components other than the recovery component to access said independently added data items; and in response to successful completion of the restoring step, committing the recovery unit of work including releasing said inaccessibility of the restored data.

Methods and recovery components as described above may be implemented within a computer program for controlling the performance of a data processing apparatus on which the program code executes. The program code may be made commercially available as a program product comprising program code recorded on a recording medium, or may be made available for download via a network such as the Internet.

BRIEF DESCRIPTION OF THE DRAWINGS

Embodiments of the invention are described in detail below, by way of example, with reference to the accompanying drawings in which.

DETAILED DESCRIPTION OF PREFERRED EMBODIMENTS

Figure 1:
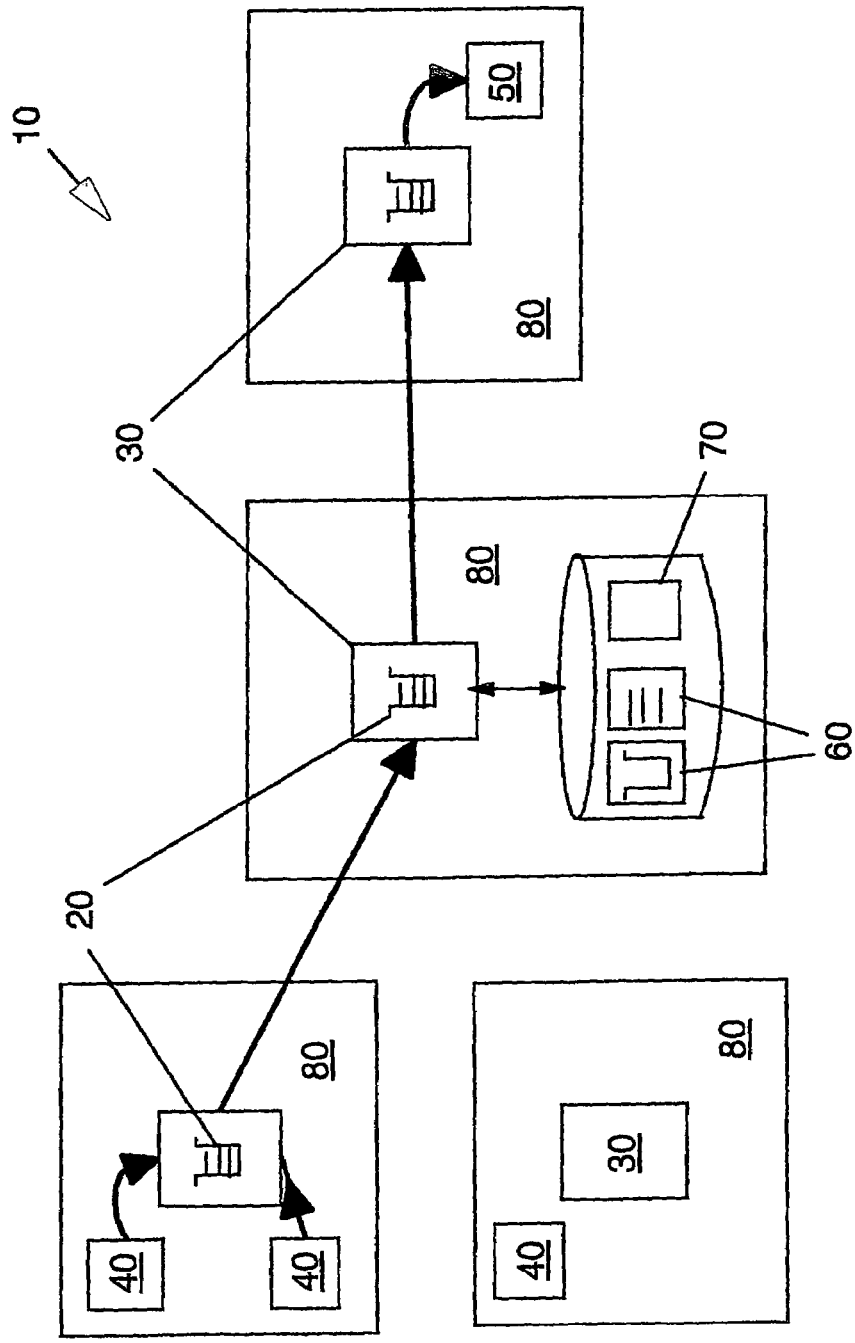
FIG. 1 shows a message communication network, in which messages are transferred between queues on route to target application programs.

A first embodiment of the invention is described below in the context of asynchronous message communication systems in which messages are queued in message repositories between the steps of a sender program sending the message and a retriever program retrieving the message. A failure of primary storage can cause loss or corruption of message data unless recovery features are available to recreate the queue and to recover messages onto the queue. While applicable to other data repositories, the invention is particularly applicable to messages queues because such queues typically contain discrete independent items (the messages) which are added and then deleted, rather than the message being added, its content updated, and then finally deleted.

As will be clear to persons skilled in the art, certain embodiments of the invention are equally applicable in a database environment in which a failure can result in loss or corruption of data within a database table, and thus necessitate recreation of the database table and restoring of data items into the table. Embodiments of the invention are also applicable in other data processing environments in which hardware or software failures necessitate recovery of a data repository, for example from backup storage and log records, and in which there is a need to minimize the loss of availability of the data repository while recovery processing is carried out.

Loss or corruption of data on a primary storage medium may result from a hardware failure or malfunction, a software malfunction, or even a human error (such as an accidental deletion of a queue and all of its messages). For ease of reference, all of these different types of failure which affect a data repository will be referred to as 'storage failures' hereafter. The loss or corruption may affect only a single queue, or database table, or file, or the failure may affect more than one queue (or table etc) such as multiple queues held within a single Coupling Facility list structure (see the explanation of CF list structures below). In typical cases, a failure affecting a CF list structure will affect all queues on the CF list structure rather than a single queue.

Messaging Environment

IBM Corporation's MQSeries™ and WebSphere™ MQ family of messaging products are examples of known products which use message queuing to support interoperation between application programs, which may be running on different systems in a distributed heterogeneous environment.

Message queuing and commercially available message queuing products are described in B. Blakeley, H. Harris & R. Lewis, "Messaging and Queuing Using the MQI", McGraw-Hill, 1994, and in the following publications which are available from IBM Corporation: "An Introduction to Messaging and Queuing" (IBM Document number GC33-0805-00) and "MQSeries—Message Queue Interface Technical Reference" (IBM Document number SC33-0850-01). The network via which the computers communicate using message queuing may be the Internet, an intranet, or any computer network. MQSeries and WebSphere are trademarks of IBM Corporation.

As is well known in transaction processing systems, a 'unit of work' is a set of processing operations that must be successfully performed together, or all backed out in the event of inability to complete the full set of operations, to ensure that data integrity is not lost. All operations within a unit of work are kept inaccessible from other processes, which may rely on the updates, until resolution of the entire unit of work allows all of the updates to be committed (all finalized and made accessible).

IBM Corporation's MQSeries and WebSphere MQ messaging products provide transactional messaging support, synchronising messages within logical units of work in accordance with a messaging protocol which gives assured once-only message delivery even in the event of system or communications failures. This assured delivery is achieved by not finally deleting a message from storage on a sender system until the message is confirmed as safely stored by a receiver system, and by use of sophisticated recovery facilities. Prior to commitment of transfer of the message upon confirmation of successful storage, both the deletion of the message from storage at the sender system and insertion into storage at the receiver system are flagged as uncommitted ('in-flight' or 'in-doubt') operations and can be backed out atomically in the event of a failure. This message transmission protocol and the associated transactional concepts and recovery facilities are described in International Patent Application Publication No. WO 95/10805 and U.S. Pat. No. 5,465,328.

The inter-program communication facilities of IBM's MQSeries and WebSphere MQ products enable each application program to send messages to the input queue of any other target application program, and each target application can asynchronously take these messages from its input queue for processing. This achieves delivery of messages between application programs that may be spread across a distributed heterogeneous computer network, without requiring a dedicated logical end-to-end connection between the application programs.

Recent versions of IBM Corporation's MQSeries for OS/390 queue manager software provide support for shared queues using OS/390 coupling facility (CF) list structures as the primary storage for shared queues. Messages on shared queues are stored as list entries in CF list structures. Applications running on multiple queue managers in the same queue sharing group anywhere in a parallel sysplex can then access these shared-queue messages, with messages being accessed in the order of allocated primary keys. From the viewpoint of the Coupling Facility, the allocation of the primary keys is arbitrarily decided and associated with each message by the queue manager. The queue manager sets the key for each message so that the overall order is the correct order for retrieval (applying FIFO ordering with exceptions, as described below).

Such shared access to specific queues has the benefits of high availability through redundancy (tolerance to failures affecting one or more queue managers within the group) and automatic workload balancing since messages are retrieved by the next available application. This provides a highly scalable architecture suitable for high message throughput.

The present embodiment is applicable to the system architecture described above —and indeed is beneficial since many applications running in this environment require high availability—but embodiments of the invention are also applicable where alternative storage structures are used. Hereafter, the term message repository is used to refer to message queues and other data structures in which messages can be held, whether implemented in CF list structures, database tables or other known structures.

As noted above, message queuing systems in the OS/390 operating system environment provide support for shared queues that can be made available to a queue-sharing group of queue managers via CF list structures. System components, data structures and methods applicable to such systems, including a number of recovery features which are suitable for use within such systems, are described in the specifications of the following co-pending and commonly-assigned patent applications, each of which is incorporated herein by reference:

U.S. patent application Ser. No. 09/605589 (corresponding to UK Patent Application No. 0009989.5—Attorney reference GB920000031), U.S. patent application Ser. No. 09/912279 (Attorney reference GB920000032), U.S. patent application Ser. No. 10/228615 (corresponding to UK Patent Application No. 0207969.7—Attorney reference GB920010101), U.S. patent application Ser. No. 10/228636 (corresponding to UK Patent Application No. 0207967.1—Attorney reference GB920020001) and U.S. patent application Ser. No. 10/256093 (corresponding to UK Patent Application No. 0208143.8—Attorney reference GB920020015).

The embodiment of the present invention described below is compatible with the recovery features described in the above-listed incorporated references.

Methods and apparatus for implementing message queues within list structures and processing list structures, as well as solutions for differentiating between operational states using distinctive keys, are described in the specifications of the following co-pending, commonly-assigned patent applications, each of which is incorporated herein by reference: U.S. patent application Ser. No. 09/677,339, filed 2 Oct. 2000, entitled "Method and Apparatus for Processing a List Structure" (Attorney reference POU920000043); and U.S. patent application Ser. No. 09/677,341, filed 2 Oct. 2000, entitled "Method and Apparatus for Implementing a Shared Message Queue Using a List Structure" (Attorney reference POU920000042).

FIG. 1 shows, schematically, a messaging network 10 in which messages are transferred between queues 20 under the control of queue manager programs 30 in a distributed network of computers 80. Sender application programs 40 put messages to their local queue, and target application programs 50 retrieve messages from their input queue, and all of the work of transferring the message across the network to the input queue of the target application program without loss of persistent messages is handled by the queue managers 30. Each queue manager maintains a backup copy 60 of its local queues and writes log records 70 to reflect updates whenever messages are added or deleted or their state is changed.

Figure 2:
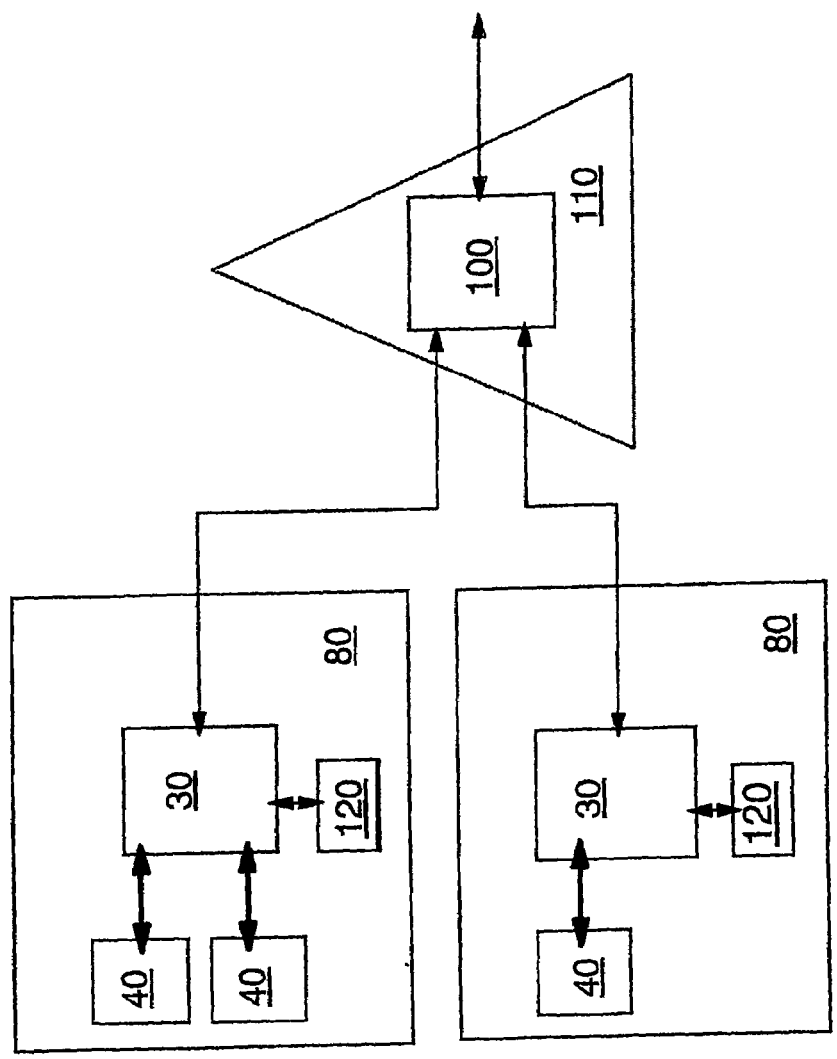
FIG. 2 is a representation of a set of queue managers having shared access to a queue within a coupling facility list structure.

FIG. 2 shows a group of queue managers 30 which have shared access to queues 100 held in a Coupling Facility (CF) list structure 110. The CF list structures are used to queue messages in both directions—to and from the queue-sharing group. In addition to the primary copy of the shared queue, a secondary backup copy 60 is held on a disk 120. Backup copies of the queue, comprising queue definition information and information relating to all the messages held on the queue at the time of the backup, are saved periodically to the disk. Log records 70 are written to the disk 120 for each update to a queue within the CF list structure. The combination of a backup copy and log records reflecting all updates since the last backup enables recreation of the primary copy of the queue in response to a media failure.

The log records contain an indication of the operation performed (insert, delete, or update state), and the unique key for the relevant message which key is generated at the time the message is added to the CF. For insert operations (and for update operations in some implementations) the log record also contains the complete content of the message. Log records for delete operations do not contain the content of the database records. In some implementations, only the information required to track changes is logged for update operations.

Recovery with Improved Availability

Some computer systems and applications can tolerate "out of sequence" updates to data repositories. That is, the systems work correctly even if the sequence of updates in the repository does not accurately reflect the sequence in which the updates were added. This is true of some systems and applications, which use message queue managers to transfer messages to and from queues when handling message delivery between application programs.

The inventors of the present invention have recognized that such systems and applications could benefit from improved availability by enabling new messages to be added to and retrieved from queues prior to completion of recovery of the data on the queues following a failure. However, before this can be achieved, a number of problems must be overcome.

If an application is enabled to access a newly created queue in parallel with old messages being restored to the queue by replay of log records, there is a danger that the same message may be processed twice by the application. For example, a message may be added to a queue, the addition operation committed, and then the message retrieved from the queue. In most cases, the message is deleted from the queue when the retrieval operation is committed. If a queue storage failure then occurs, the queue can be recreated from backup storage followed by reapplying updates to the queue from log records. During log replay, the message is restored to the queue and becomes available to retriever applications when the commit of the addition operation is replayed, and then disappears when the message retrieval operation is replayed. However, if application programs are able to access the queue during recovery, an application program may retrieve the message as soon as it becomes available (i.e. before replay of the message retrieval log record) and process a message which has already been processed before.

The above sequence of events, and other examples, can result in unacceptable deviation from assured once-only message delivery.

A solution to this problem is described below, which can recover from a primary storage failure by recovering messages to shared queues while the shared queues are in use by an application which is processing new messages, without deviating from assured once-only delivery of messages. 'New messages' in this context are messages added to the queue for the first time after a failure. 'Old messages' are those that were added to the queue prior to the failure and which are restored to the queue following the failure.

Recovery Processing within Recovery Unit of Work

In the present embodiment, the restore process is performed as a Recovery Unit of Work. That is, the sequence of steps of restoring messages to a queue and updating the state of messages on the queue from backup storage and by replaying the log are performed and committed within the scope of a newly-defined unit of work.

For example, the actions of replaying an out-of-syncpoint message 'Put' operation (adding a message to a queue) or 'Get' operation (retrieving a message from the queue), or replaying commit of an in-syncpoint Put or Get, are performed as in-syncpoint Puts and Gets within the Recovery Unit of Work. The Recovery Unit of Work covers the entire process of restoring messages to the queue and replaying operations which change the state of those messages.

A unit of work is a set of operations which must be performed together (or not at all) if the data affected by the set of operations is to be left in a consistent state at the end of performing the set of operations. A syncpoint is an identifiable point within processing at which data is in a consistent state, and syncpoints are recorded at the end of each unit of work to record this point of consistency. Reference to recorded syncpoints enables a determination to be made of how far back in time to rollback processing in order to return to a point of data consistency. A single transaction can include a number of Put_Message and Get_Message operations which are processed as a single unit of work. When the transaction is committed, all of the Put and Get operations within the unit of work are finalized such that messages Put onto a queue appear on the queue as retrievable messages and messages for which Get operations have been performed are finally deleted. However, in some transactional systems, certain Put_Message and Get_Message operations can be made to take effect immediately without awaiting the final resolution of the transaction—these are referred to as "out-of-syncpoint" Put and Get operations.

As noted previously, a failure may affect a single queue or multiple queues (for example all queues within a specific CF list structure). If multiple queues must be recovered, it is desirable for a single invocation of the recovery process to initiate recovery of all of the affected queues. Improved processing efficiency can be achieved by recreating a set of affected queues and then performing a single recovery unit of work which encompasses restoration of messages and message updates for the whole set of affected queues.

The recovery process has access to and uses whatever log or logs contain information relating to changes to the queue or queues being recovered. In a shared queue environment, it is likely that each queue manager will have maintained its own physically separate log, and each log can comprise a set of files. The recovery process can read all of the logs in parallel, logically constructing a single, merged log. The single merged log (which in general does not exist as a single physical file) contains all of the changes to the queue or queues being recovered, as well as changes to other queues that are unaffected by the failure. The restore process ignores changes to queues which are not required for the current recovery processing.

Figure 3:
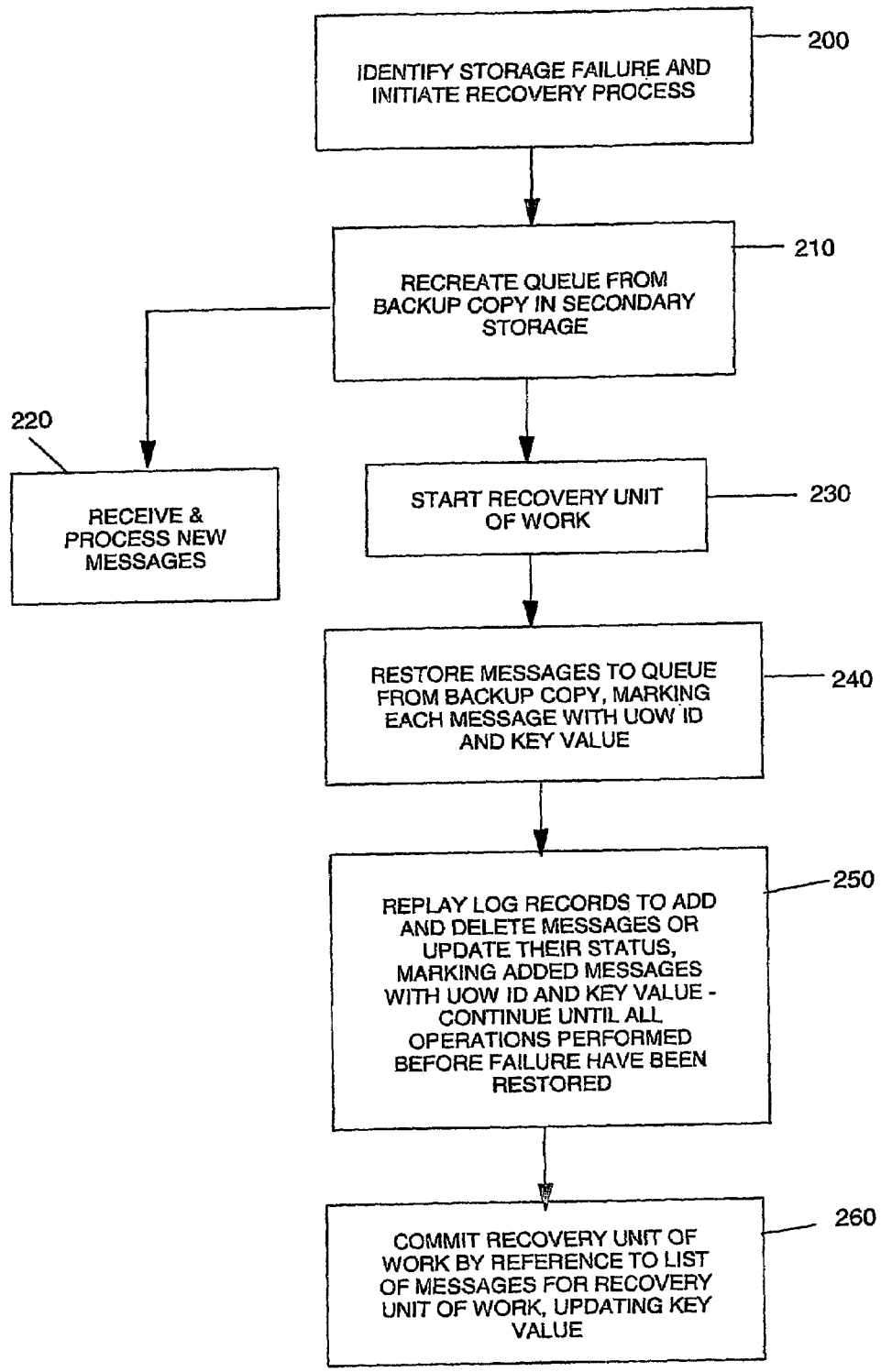
FIG. 3 shows a sequence of steps of a recovery method according to an embodiment of the invention.

A specific sequence of recovery processing operations are described below in detail, with reference to FIG. 3. For ease of reference, the following description of recovery processing describes the example of recovering a single queue.

A first step 200 of the method is the identification of a storage failure. In many cases, software using a data repository will be made aware that data has been lost or corrupted by either the hardware (which may be inaccessible, for example) or the operating system or other runtime environment such as a Java Virtual Machine (which may return an error indication when access is attempted). In the preferred embodiment, the software using a data repository automatically initiates 200 recovery processing when the software becomes aware of a problem. In particular, a queue manager program which is using the failed queue or queues responds to a specific set of error conditions by starting a recovery process which is a component of the queue manager.

In alternative embodiments, the software can be written to present a suitable error notification in response to a failure—prompting human intervention to manually initiate the recovery processing. Additionally, operator action will generally be required to initiate recovery if a storage failure occurs due to accidental or malicious deletion of data.

When initiated in response to identification of a failure, the recovery process accesses secondary storage and retrieves 210 the backup copy of the queue definitions corresponding to the failed queue(s), and uses the retrieved definitions to recreate 210 an empty copy of the queue within primary storage.

In the preferred embodiment, the definition of a queue (or other data repository) is held in backup secondary storage separately from the contents of the queue. Backup of the queue definitions as an independent step from backup of a snapshot of the queue contents is beneficial because it facilitates recreation of the queue in an empty state as a separate step before the contents are restored. The queue can be made available for receipt of new messages as soon as it has been recreated in primary storage from its queue definitions.

In conventional recovery solutions, a lock is obtained on a newly recreated data repository from the time the repository is recreated until the recovery processing is complete, and locks are perceived to be necessary to prevent duplication of messages. No such lock is required in the present embodiment, and so the data repository (i.e. the queue or database table, but not any updates within the Recovery Unit of Work) is available for use by applications as soon as the data repository is recreated.

Having recreated the queue (in an empty state), a Recovery Unit of Work is then started 230 for restoring messages and message updates to the queue. In addition to the queue definitions required for recreation of a queue in its empty state, the secondary storage contains a backup copy of the queue contents which corresponds to a snapshot of messages on the queue at the time that the backup was taken. The messages within the backup copy are restored 240 to the primary copy of the relevant queue, using a copy operation together with the step of marking each message to indicate that they are part of the uncommitted recovery unit of work. This marking makes them inaccessible to applications which could otherwise retrieve restored messages from the queue.

In the preferred embodiment, the marking of messages is implemented by allocating a unit of work ID and a distinctive primary key to each message, with the value of one byte of the key indicating the state of the message. Queue managers can then interpret the byte value of the primary key to determine whether a message can be retrieved by an application program or not. Any message update within an uncommitted recovery unit of work cannot be accessed by applications at this stage (not until the byte value is changed at commit of the recovery unit of work). This is described in further detail below, under the title 'Distinctive Keys'. The unit of work ID is useful in case the recovery processing is aborted (such as if a queue manager fails part way through recovery processing), since it enables easy deletion of all of the operations performed within the recovery unit of work. IBM Corporation's MQSeries queue manager programs are known to have peer recovery capabilities which enable them to take over queue recovery processing in such circumstances.

As restoration processing proceeds, the recovering queue manager also generates a list of all of the messages for which operations are performed within the recovery unit of work. This list is used later on during commit processing.

Log records, written between the time of the backup copy and the time of the storage failure, are then replayed 250 to provide information about all updates to the queue which have been lost as a result of the failure. Each log record corresponds to a message add operation (such as a Put_Message operation), a message delete operation (such as a destructive Get_Message operation), or a status update (such as a commit or backout). As each log record is replayed, the queue is updated by the corresponding operation and the message is marked with the unit of work ID of the recovery unit of work and by assigning a primary key including a byte value within the 'in-recovery' range of byte values—as described above. This continues until the point in the log records corresponding to the time of the failure.

When the restore processing reaches the point in the log records corresponding to the time of the storage failure, the message repository has been restored to the state it was in at the time of the failure—subject to messages added and retrieved independent of the restore process.

At this point, the restore processing is completed by committing 260 the Recovery Unit of Work. A syncpoint is taken to record the consistent state of the queue data and all messages become available to applications. In particular, committing the unit of work includes identifying all relevant updates by referring to the list of messages added, deleted or updated during performance of restore operations for the recovery unit of work and then updating, for each message in the list, the state-indicating byte value within the distinctive primary key to a value representing the new state of the message. Changing the high-order byte value moves the committed messages to a new position in the queue, since the key values are indicative of the desired message retrieval order as well as being indicative of message state.

If the steps of restoring 'old' messages and message updates to the queue fails, the separately performed recreation of the queue should enable the continued use of the queue for 'new' messages while the restore steps of the recovery processing are retried. Thus, the sequence of operations of performing a first recreation step and subsequently reapplying updates by reference to log records not only makes the queue available for new messages at an early stage but also shields the queue recreation and new message processing from any problems affecting the restore processing. The combination of these features can result in significant improvements to the availability of messaging functions as well as avoiding the exceptional processing required in response to 'queue full' conditions.

From this point onwards, assuming the recovery was successful, normal message processing operations can continue for all messages on the queue. When a queue manager which is using the restored queue next checks the state-indicating byte value of the message, the new state of the message will determine whether or not it can be retrieved.

An in-syncpoint Get operation within the Recovery Unit of Work differs from a conventional application Get operation in that the new Get operation specifies which message the operation is to retrieve, so as to replay operations from the log in the correct sequence. Conventional Get operations typically retrieve the first available message, but such an approach during recovery processing could result in inconsistencies between the queue at the time of failure and the recovered queue, since a different message may be retrieved by the Get operation during recovery processing than was retrieved by the original Get operation. Therefore, although some applications do not themselves require messages to be processed in the same order as the messages were placed on the queue, nevertheless message updates replayed from log records are applied in a manner which ensures consistency with the sequence of operations performed before the failure.

Suitable techniques for specifying a particular message to be retrieved by a Get_Message operation are already known in the art and so are not described herein in detail. One example implementation is for the Get_Message operation to use the unique key (unique for all messages within a sysplex) which is allocated to each message when the message is added to a shared queue.

Deferral of Restore Operations

Figure 4A:
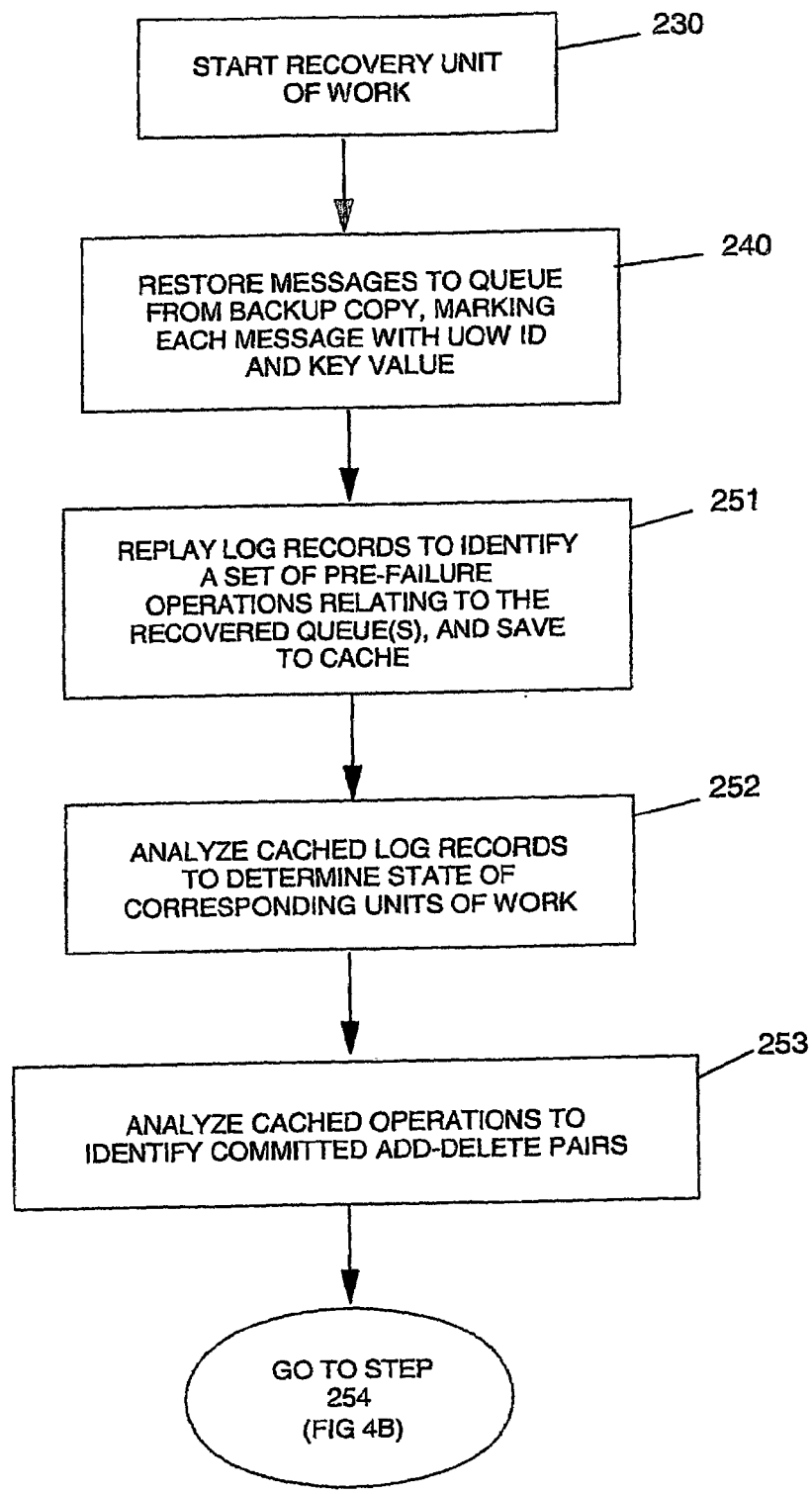
FIG. 4 shows a sequence of steps of a recovery unit of work according to an embodiment of the invention.
Figure 4B:
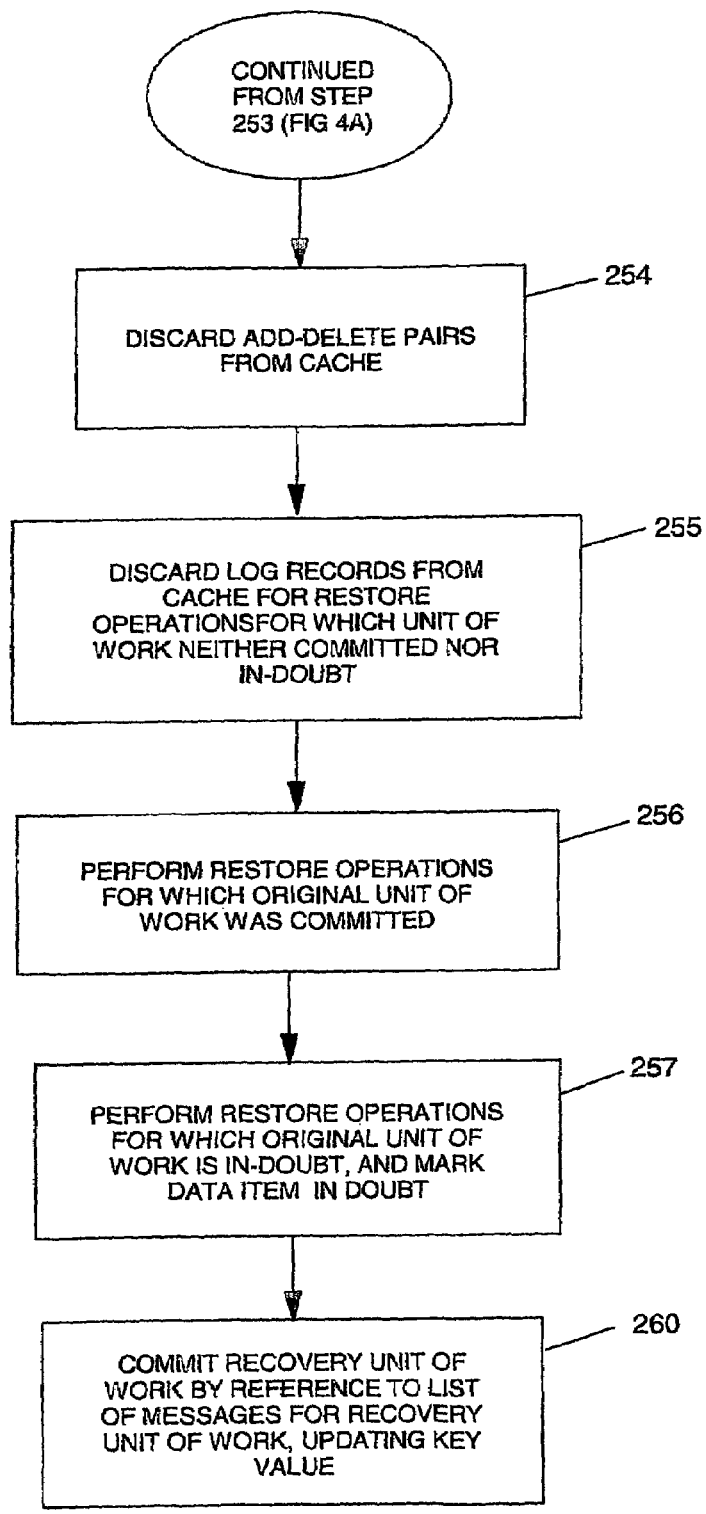

In the present embodiment of the invention, recovery does not immediately replay in-syncpoint Get and Put operations when processing the log. Instead, as shown in FIG. 4, the Get and Put operations are cached 251 until replay of the log enables a determination to be made 252 of the state of the corresponding unit of work. The log is replayed and operations relating to the message queue or queues being recovered are identified. The identified log records are copied to a cache. When the restore processing reaches the point in the log records corresponding to the time of the failure, the cached log records are analyzed 252 to determine the state, at the time of the failure, of each corresponding (original) unit of work.

When the determination 252 is performed, one of the following actions is taken:

1. If the unit of work is committed, the Put or Get is performed 256 (as described above) as part of the recovery processing;
2. If the unit of work remains in-doubt at the end of the Recovery Unit of Work, the recovery processing performs the Put or Get but additionally marks the operation as in-doubt 257 and as part of the original unit of work—as required for eventual resolution of the unit of work by the coordinating syncpoint manager; and
3. For all remaining cases (backout, abort, or presume-abort), the cached Get and Put operations are discarded 255.

The recovery unit of work is then committed, as described previously.

The recovery processing method described above enables the restore process to run in parallel with use of the newly re-created queue and without sacrificing assured once-only delivery of messages.

Optimized Handling of Paired Updates

The inventors of the present invention recognised that an in-syncpoint replay of a committed Get operation within the Recovery Unit of Work is necessarily getting a message Put to the queue within the same Recovery Unit of Work. The replay may include replay of a Get_Message operation followed by replay of commit for the original unit of work. The particular message can be deleted in response to the committed Get_Message operation without waiting for commit of the Recovery Unit of Work at the end of the restore process. In the present embodiment, Put and Get pairs within the Recovery Unit of Work are identified 253 and the corresponding cached log records are deleted 254 from the cache without the need to update the queue and then delete the update. This feature of the embodiment complements the 'cache-until-resolution' feature mentioned above to avoid unnecessary processing and to allow the restoring queue manager to reduce the build-up of messages on the queue. This potentially avoids unnecessary queue or repository 'full' conditions.

Distinctive Keys

It is known within the shared queue support mechanisms of existing queue managers to use distinctive primary keys to differentiate between messages in a Coupling Facility (CF) which are in different states. Typically, the states are committed, in-flight and in-doubt. Such use of distinctive keys to differentiate between states is described, for example, in the specifications of commonly-assigned co-pending U.S. patent application Ser. No. 09/677,339 and Ser. No. 09/677,341, which are incorporated herein by reference.

The present embodiment uses distinctive primary key values for messages which are in-flight within the Recovery Unit of Work. 'In-flight' is the state of a transaction before a request is made for commit or backout (or before a 'prepare to commit' instruction in the case of two-phase commit). If there is a failure while a transaction is in-flight, the message state is resolved to backout. This is well known as the "presume abort" approach. 'In-doubt' is a state which applies to two-phase commit of transactions which involve an external transaction coordinator. The coordinator issues a 'prepare' request for the transaction to each resource manager which has an interest. Following completion of the prepare step, the transaction is no longer 'in-flight' but is now said to be 'in-doubt'. Resolution from in-doubt to commit or abort is performed in response to a subsequent call from the transaction coordinator. Log records may or may not have been written for Get and Put operations performed by an in-flight transaction.

The distinctiveness of the primary keys is achieved by using distinct ranges of values for one byte within the primary key. For example, the first byte of the primary key of messages on a Put list (i.e. a list representing the messages which have been Put to the queue) contains a value in the range X'00' through X'09' if the message is committed and a value in the range X'F4' through X'F6' if the message is not committed. The specific allocation of byte values within the state-indicating range of values simply follows the sequence of values within the range to achieve FIFO ordering. Other schemes for allocating distinctive keys are equally possible.

When an application program issues a Get Message call, the primary key values of messages in the queue are investigated and compared with a list of key ranges to determine the state of the message. The state of a message as reflected by the primary key value determines whether an application can retrieve the message, but the key values also determine the ordering of messages in the queue and so messages for which retrieval is not possible have key values corresponding to the rear end of the queue. This means that simple numerical ordering avoids irretrievable messages whenever retrievable messages are available in the queue.

Using distinctive keys in this way allows a queue manager to selectively access messages in particular states, and permits simple implementation of other functions such as triggering based on the number of committed messages in the queue. By putting special values in the high-order byte of the key, messages which have been added (Put) to the queue but not yet committed are positioned at the rear end of the list, which makes them easy to ignore when a queue manager is performing a Get_Message operation on behalf of an application.

Distinct high-order byte values can be used to differentiate between a number of different states of a message following invocation of a Put_Message operation. For example, a first range of byte values can indicate a message for which a Put has been performed together with the first 'prepare' phase of a two-phase commit, but the Put is not yet committed; whereas a second range of values indicates a message for which the prepare phase of the commit has not yet been performed following a Put.

Two new operational states are defined in the present embodiment, with corresponding distinct keys for each operation and message—one byte of each key containing the distinguishing value within a value range which identifies the state. The new states are only applicable to messages placed in the message repository (in this case the CF shared queue) as part of the restore process. One state corresponds to uncommitted within the original unit of work (the UoW being replayed) and the Recovery Unit of Work, and the second state corresponds to committed within the original unit of work but as yet uncommitted within the Recovery Unit of Work.

These new message states and distinctive key values provide the following benefits:

In-syncpoint Put operations can be replayed by storing the message on the CF with a distinctive key. The distinctive key prevents the message being processed by other processes that perform actions on the queue, and prevents the message from being included in queue depth calculations, among other things. This means that the restore process does not need to cache these Put operations in memory—which considerably reduces the code complexity and the storage occupancy of the restore process.

Out-of-syncpoint Put operations and commits of in-syncpoint Put operations can be replayed by setting a key value that is distinct from normal out-of-syncpoint activity. This means that the commit of the Recovery Unit of Work can be performed by updating primary key values (replacing a value in a first range of values with a value from a second range corresponding to a different state) without requiring an in-memory or CF administration structure model of the Recovery Unit of Work. Such structures are required in typical alternative implementations.

It will be clear to persons skilled in the art, in the light of this disclosure, that various modifications of the specific embodiments described can achieve the advantages of the present invention and are within the scope of the invention as set out in the accompanying claims.

For example, the above description of preferred embodiments refers to recreating a data repository and restoring data to the repository. It will be clear to persons skilled in the art that some solutions within the scope of the present invention involve restoring all of the data that was in the repository at the time of a failure. Other solutions only require recovery of certain classes of data—such as only recovering persistent messages and excluding non-persistent messages. In the latter, log records may not be written for non-persistent messages such as information-only data broadcasts. For example, a message containing a periodically updated weather forecast or stock price may not need to be recovered if the next update will be available shortly, whereas a message instructing cancellation of a flight reservation or sale of stocks must be recoverable to enable assured once-only delivery.

Secondly, while the above description noted that processing efficiencies can be achieved by restoring data items to multiple queues within the scope of a single recovery unit of work, alternative implementations will recover each queue within its own separate unit of work. This will decrease the impact of certain types of failure during recovery processing.

Thirdly, the above description refers to a specific method for marking messages to make them unavailable for retrieval by application programs until commitment of the Recovery Unit of Work. Other mechanisms for controlling the unavailability of restored messages while avoiding locking the repository for the entire recovery period, are also possible. One such example is setting a unit of work identifier and setting an in-doubt flag for each restored message which is separate from the distinctive primary keys.

The above description of a preferred embodiment of the invention uses independently-saved backup copies of a queue's definitions and the queue's contents. Alternative embodiments maintain both the information defining a data repository and the repository's contents at the time of the backup in a single secondary copy. Nevertheless, the recovery processing can retrieve the stored data from secondary (backup) storage and process that data in a sequence to enable a fast recreation of the repository and making it available for new data items, followed by a separate step of restoring the repository's contents.

Further embodiments of the invention are applicable to database solutions. In a database table, new rows may be inserted into the table and processed before old rows (which were populated with data prior to the failure) are recovered. During recovery, applications will see the table as containing only the new rows until such time as the recovery is complete.

The above description of a preferred embodiment discloses a recovery method and apparatus which encompasses: (i) rebuilding a data repository in an empty state for fast availability and then handling restore operations as a recovery unit of work; (ii) performing restore operations in dependence on the determined state of the corresponding original unit of work, for efficient restore processing; (iii) optimized handling of paired updates for efficient processing and to avoid build up in the data repository; and (iv) use of distinctive primary keys to indicate specific in-recovery states of data items and updates to data items. While features (i) to (iv) are complementary, it is not essential to the operation of any one of these features (i) to (iv) for all of the features (i) to (iv) to be implemented together, as will be clear to persons skilled in the art.

The invention claimed is:

1. A method for recovering a data repository from a failure affecting a primary copy of the data repository, including the steps of:

maintaining a secondary copy of data sufficient to recover the primary copy of the data repository and data items held thereon;

in response to a failure affecting the primary copy of the data repository, recreating a primary copy of the data repository from the secondary copy;

using a restore process to restore data items to the primary copy from the secondary copy within a recovery unit of work, wherein data items restored to the primary copy of the data repository within the recovery unit of work are made inaccessible to processes other than the restore process until commit of the recovery unit of work;

prior to commit of the recovery unit of work, configuring the primary copy of the data repository to enable addition of data items to the data repository independent of said restore step and to enable processes other than the restore process to access said independently added data items; and in response to successful completion of the restore step, committing the recovery unit of work including releasing said inaccessibility of the restored data.

2. A method according to claim 1, wherein maintaining the secondary data copy comprises storing a backup copy of the data repository and storing log records describing updates to the primary copy performed since the backup copy was stored; wherein recreating the primary copy of the data repository includes the step of copying data repository definitions from the backup copy and applying the definitions to recreate the primary copy; and wherein restoring data items to the primary copy comprises copying data items from the backup copy and replaying the log records to identify and reapply updates to the primary copy.

3. The method according to claim 1, wherein maintaining the secondary data copy includes storing log records that describe updates to the primary copy, and wherein the step of restoring the primary copy of the repository includes the steps of:
- replaying the log records of operations performed on data items within the primary copy of the data repository;
- caching log records relating to operations performed under syncpoint control within an original unit of work;
- determining from the cached log records the state of the original units of work at the time of the failure; and
- determining which of said syncpoint-controlled operations to perform within the recovery unit of work based on the determined state of the original units of work.

4. The method according to claim 3, including performing operations within the recovery unit of work in accordance with the following procedure:
- if the original unit of work was committed before the failure, performing the relevant operations of the committed unit of work;
- if the original unit of work was in-doubt when the failure occurred, performing the relevant operations of the in-doubt unit of work but marking the operations in-doubt; and
- if the original unit of work is neither committed nor in-doubt, discarding the cached operations.

5. The method according to claim 3, including discarding from the recovery unit of work any pairs of addition and deletion operations that comprise an addition of a data item to the primary copy of the data repository and a deletion of the same data item from the primary copy of the data repository, on condition that said addition and deletion operations were performed and committed before the failure.

6. The method according to claim 5, wherein the data repository is a message repository and the step of restoring data to the primary copy of the data repository comprises performing message add, update and delete operations on the message repository.

7. The method according to claim 6, for performance within a messaging communication system, wherein maintaining the secondary data copy includes storing log records to describe updates to the primary copy, and wherein the step of restoring data to the primary copy of the repository includes the steps of caching log records relating to message add, update and delete operations performed under syncpoint control within an original unit of work, determining from the log records the state of the original unit of work at the time of the failure, and determining the operations to perform within the recovery unit of work based on the determined state of the original unit of work as follows:
- if the original unit of work is committed, performing the relevant message add, update and delete operations; and
- if the original unit of work is in-doubt, performing the relevant message add, update and delete operations but marking the operations in-doubt; and
- if the original unit of work is neither committed nor in-doubt, discarding the cached operations.

8. The method according to claim 1, wherein data restored to the primary copy of the repository within the recovery unit of work is made inaccessible by setting a flag for each data item restored to the data repository, the flag indicating that the data item is not accessible.

9. The method according to claim 8, wherein the flag indicates a transactional state of the data item and wherein a process for retrieving data items from the repository is adapted to identify one or more predefined transactional states as inaccessible.

10. The method according to claim 9, wherein the flag comprises a byte value of a distinctive primary key allocated to the data item when the data item is restored to the data repository, the byte value being selected from a range of values indicative of the transactional state of the data item.

11. The method according to claim 10, wherein the step of setting a flag comprises:
- setting a first flag for any data item for which the latest operation performed on the data item prior to the failure was a committed add operation which is to be restored to the data repository within the recovery unit of work; and
- setting a second flag for any data item for which the latest operation performed on the data item prior to the failure was an in-doubt add or delete operation which is to be restored to the data repository within the recovery unit of work.

12. The method according to claim 11, wherein the first flag comprises a byte value of a data item key selected from a first range of byte values representing a first transactional state and the second flag comprises a byte value of a data item key selected from a second range of byte values representing a second transactional state.

13. A data communication system including:
- data storage for storing a primary copy of a data repository;
- secondary data storage for storing a secondary copy of data representing the data repository which secondary data is sufficient to recover the primary copy of the data repository and data held thereon;
- a recovery component for controlling the operation of the data communication system to recover from a failure affecting the primary copy of the data repository, wherein the recovery component is operable to control the data communication system to perform the steps of:
  - recreating a primary copy of the data repository from the secondary copy; and
  - using a restore process to restore data items to the primary copy from the secondary copy within a recovery unit of work, wherein data items restored to the primary copy of the data repository within the recovery unit of work are made inaccessible to processes other than the restore process until commit of the recovery unit of work;
  - prior to commit of the recovery unit of work, configuring the primary copy of the data repository to enable addition of data items to the data repository independent of said restore step and to enable processes other than the restore process to retrieve said independently added data items; and
  - in response to successful completion of the restore step, committing the recovery unit of work including releasing said inaccessibility of the restored data.

14. The data communication system according to claim 13, comprising a data communication system for transferring messages between a sender and a receiver, wherein messages are held in the data repository following a message send operation by the sender and the messages are subsequently retrieved from the data repository for delivery to the receiver, and wherein a backup copy of the data repository is created and log records are written to record message send and message retrieval events since creation of the backup copy, wherein the recovery component is adapted to control the data communication system to perform the following steps:
- in response to a failure affecting the data repository, restoring messages to the data repository by reference to the backup copy of the data repository which backup copy was created prior to the failure;
- prior to completion of the recovery processing, configuring the data repository to enable new messages to be added to the data repository and retrieved therefrom without awaiting completion of the recovery processing; and reapplying updates to the data repository corresponding to message send and message retrieval operations performed prior to the failure, by reference to log records created prior to the failure;

wherein the steps of restoring messages to the data repository and reapplying updates to the data repository by reference to the backup copy and log records are performed within a recovery unit of work and the restored messages and reapplied updates are made inaccessible until all data repository updates corresponding to send and retrieve operations performed prior to the failure have been reapplied to the data repository.

15. A computer program product comprising program code recorded on a recording medium for controlling the operation of a data processing apparatus on which the program code executes to perform a method for recovering a data repository from a failure affecting a primary copy of the data repository, for use with a data processing apparatus having a secondary data storage and having a component for maintaining a secondary copy of data in the secondary data storage which secondary copy is sufficient to recover the primary copy of the data repository and data items held thereon, the method including the steps of:

in response to a failure affecting the primary copy of the data repository, recreating a primary copy of the data repository from the secondary copy;

using a restore process to restore data items to the primary copy from the secondary copy within a recovery unit of work, wherein data items restored to the primary copy of the data repository within the recovery unit of work are made inaccessible to processes other than the restore process until commit of the recovery unit of work;

prior to commit of the recovery unit of work, configuring the primary copy of the data repository to enable addition of data items to the data repository independent of said restore step and to enable processes other than the restore process to retrieve said independently added data items; and in response to successful completion of the restore step, committing the recovery unit of work including releasing said inaccessibility of the restored data.

16. A computer program embodied in a computer readable medium for controlling the operation of a data processing apparatus on which the program executes to perform a method for recovering a data repository from a failure affecting a primary copy of the data repository, wherein the data processing apparatus has a secondary data storage area and wherein the computer program includes a component for maintaining a secondary copy of data in the secondary data storage area which secondary copy is sufficient to recover the primary copy of the data repository and data items held thereon, the method including the steps of:

in response to a failure affecting the primary copy of the data repository, recreating a primary copy of the data repository from the secondary copy; and using a restore process to restore data items to the primary copy from the secondary copy within a recovery unit of work, wherein data items restored to the primary copy of the data repository within the recovery unit of work are made inaccessible to processes other than the restore process until commit of the recovery unit of work;

prior to commit of the recovery unit of work, configuring the primary copy of the data repository to enable addition of data items to the data repository independent of said restore step and to enable processes other than the restore process to access said independently added data items.

* * * * *